United States Patent
Wang et al.

(10) Patent No.: US 12,191,503 B2
(45) Date of Patent: Jan. 7, 2025

(54) FIBROUS ELECTRODE MATERIAL, PREPARATION AND APPLICATION THEREOF

(71) Applicant: DALIAN INSTITUTE OF CHEMICAL PHYSICS, CHINESE ACADEMY OF SCIENCES, Liaoning (CN)

(72) Inventors: Suli Wang, Liaoning (CN); Zhangxun Xia, Liaoning (CN); Gongquan Sun, Liaoning (CN)

(73) Assignee: Dalian Institute of Chemical Physics, Chinese Academy of Sciences, Liaoning (CN)

( * ) Notice: Subject to any disclaimer, the term of this patent is extended or adjusted under 35 U.S.C. 154(b) by 60 days.

(21) Appl. No.: 17/595,033

(22) PCT Filed: Dec. 16, 2019

(86) PCT No.: PCT/CN2019/125655
§ 371 (c)(1),
(2) Date: Nov. 5, 2021

(87) PCT Pub. No.: WO2021/114317
PCT Pub. Date: Jun. 17, 2021

(65) Prior Publication Data
US 2022/0246945 A1 Aug. 4, 2022

(30) Foreign Application Priority Data

Dec. 10, 2019 (CN) .......................... 201911258188.9
Dec. 10, 2019 (CN) .......................... 201911259321.2

(51) Int. Cl.
*H01M 4/86* (2006.01)
*D01D 5/00* (2006.01)
(Continued)

(52) U.S. Cl.
CPC ........ *H01M 4/8626* (2013.01); *D01D 5/0015* (2013.01); *D01F 9/08* (2013.01);
(Continued)

(58) Field of Classification Search
CPC ..... D01F 9/08; H01M 4/8626; H01M 4/8825; H01M 4/921; H01M 8/1018; D01D 5/0015
See application file for complete search history.

(56) References Cited

U.S. PATENT DOCUMENTS

2007/0037040 A1\* 2/2007 Koyama .............. H01M 8/1011
429/535
2009/0258274 A1\* 10/2009 Uensal .................... H01M 4/86
29/623.5

(Continued)

FOREIGN PATENT DOCUMENTS

CA 2590317 A \* 6/2016
CN 101740225 A 6/2010
(Continued)

OTHER PUBLICATIONS

English translation of CN109913971A to Wang et al. (Year: 2017).\*

*Primary Examiner* — Lucas J. O'Donnell
(74) *Attorney, Agent, or Firm* — NKL Law; Allen Xue (57) ABSTRACT

An electrode material of a fibrous structure has a platinum-based electrocatalytic material, an electrospinning polymer material, and an oxide material and/or one or more organo-phosphorus acid material with ion conduction. In the micro-morphology has the structure of nanofibers, but also has porous morphological characteristics, the electrode material of this structure is prepared by electrostatic spinning technology, can be used as a high-temperature polymer electrolyte membrane fuel cell porous electrode.

7 Claims, 4 Drawing Sheets

(51) Int. Cl.
  *D01F 9/08* (2006.01)
  *H01M 4/88* (2006.01)
  *H01M 4/92* (2006.01)
  *H01M 8/1018* (2016.01)

(52) U.S. Cl.
  CPC ......... *H01M 4/8825* (2013.01); *H01M 4/921* (2013.01); *H01M 8/1018* (2013.01)

(56) References Cited

U.S. PATENT DOCUMENTS

| | | |
|---|---|---|
| 2011/0052467 A1 * | 3/2011 | Chase ................ B01D 53/8678 502/332 |
| 2014/0162110 A1 | 6/2014 | Chen et al. |
| 2022/0237243 A1 | 7/2022 | Deluca et al. |

FOREIGN PATENT DOCUMENTS

| | | | |
|---|---|---|---|
| CN | 102185126 A | 9/2011 | |
| CN | 104716348 A | 6/2015 | |
| CN | 104752734 A | 7/2015 | |
| CN | 108166091 A | 6/2018 | |
| CN | 109913970 A | 6/2019 | |
| CN | 109913971 A | 6/2019 | |
| CN | 111445081 A | 7/2020 | |
| CN | 113543156 A | 10/2021 | |
| CN | 115413044 A | 11/2022 | |
| WO | WO-2012058425 A2 * | 5/2012 | ............. B29C 43/02 |

* cited by examiner

FIBROUS ELECTRODE MATERIAL, PREPARATION AND APPLICATION THEREOF

TECHNOLOGICAL FIELD

This disclosure relates to a new composite fibrous electrode and its preparation method. Specifically, the fibrous electrode is composed of a precious metal catalyst, polymer fibers, an oxide carrier material, and/or organophosphorus material, in which the fiber diameter, the fiber composition ratio, and the porosity are adjustable, and is suitable for high temperature proton exchange membrane fuel cell electrode.

The disclosure also relates to the preparation method of the composite material.

TECHNOLOGICAL BACKGROUND

High temperature phosphate electrolyte (150-200° C.) polymer electrolyte membrane fuel cell, due to its high operating temperature, has a faster electrode reaction kinetics and higher tolerance to catalyst poisons such as anode CO, and is a new fuel cell technology with great potential that can directly use as fuel the hydrogen-reach reformate from methanol and other liquid fuel. It has a good prospect for applications in in transportation, mobile backup power supply, and other traditional oil machine replacement field. However, at the same time, the phosphate electrolyte at high temperature has a severe corrosive effect on precious metals and carbon material carriers in electrodes, especially under the effect of electric fields. Carbon carrier corrosion can easily lead to the agglomeration of precious metal nanoparticles and shedding, resulting in the loss of electrochemical active sites, which reduces electrode performance and affects the life of membrane electrodes.

Electrode materials with ordered fiber structure have great potentials for application in electronics, energy, biomedicine and other fields. Conductive materials suitable for electrochemical environments in electrodes are usually carbon-based nanomaterials of various kinds, such as carbon nanotubes, graphene, activated carbon, etc. One of the distinctive features of this kind of material is that it usually is flexible and, in the process of forming porous electrodes, its porous structure has primary and secondary pore structures due to particle accumulation. In the fuel cell electrode, controlling the pore structure as well as the controllability of charge and material conduction in the structure are the basic requirements for studying the basic process of electrode, explaining electrode electrochemical behavior and improving electrode performance. In the traditional electrode preparation method, the electrode material slurry, by various coating techniques on the substrate to build cross-link stacked electrode layer, often has porosity, pore size and channel shape that are difficult to control, it is difficult to achieve the in-depth study of electrode performance composition, but also difficult to improve electrode performance. For these reasons, the development of method for prepare electrodes that has controllable pore size and porosity, and is also simple and easy, suitable for the vast majority of electrode materials, is one of the keys to the development of porous electrodes.

The preparation method of nanofiber material based on electrospinning technology can effectively synthesize electrode material as a catalyst carrier for oxide materials that are difficult to introduce by traditional methods. Its high corrosion resistance is expected to solve deficiencies in the stability of fuel cells in high temperature phosphoric acid system.

SUMMARY

The disclosure provides a method for a fibrous electrode material, which has an electrocatalytic material based on platinum, polymer fibers, and an oxide carrier material and/or organophosphorus material, which has nanofibers in micromorphology, and also has a porous structure, the electrode material of which is prepared by electrostatic spinning technology and can be used as a multi-porous electrode of a high-temperature polymer electrolyte membrane fuel cell.

To achieve the above purposes, the present disclosure adopts the following specific schemes to achieve:

A fibrous electrode material containing nanofibers with a diameter of micron or submicron, with diameters ranging from 20 nm to 500 nm, and a porous structure with a diameter on the scale of nano meters and in the range of 1 nm to 50 nm, and an electrode material with a porosity of 20 to 80%.

The diameter of the nanofiber is preferably 100 nm to 200 nm, the pore size is preferably 5 nm-20 nm, and the porosity of electrode material is preferably 50-80%.

The composition of the nanofibrous material includes electrocatalytic active material, oxide material, and polymer fibers, the polymer fibers constitute the carrier of the nanofibrous electrode, interwoven to form an electrode material, and the oxide material constitutes a porous structure of the nanofibrous electrode. The active electrocatalytic material is deposited on the porous oxide material carried by the carrier, and the pore size of the porous structure of the oxide material with active electrocatalytic material loaded thereon ranges from 1 nm to 50 nm, with the porosity of 40 to 60%. The active material of the electrocatalyst are nanoparticles having a diameter of 2-10 nm.

The active electrocatalytic material includes platinum and/or one or more platinum alloys containing iron, nickel, cobalt, copper, gold, silver or palladium. The oxide material includes one or more among silicon oxide, titanium oxide, tungsten oxide, and indium tin oxide. The polymer fiber is one or more of polyacrylic acid, polyethylene oxide, and polyvinylpyrrolidone.

The mass ratio of active electrocatalytic material and the oxide material is 3:1 to 1:10, preferably in the range of 1:1 to 1:2. In the platinum alloy the mass ratio between platinum and one or more among iron, nickel, cobalt, copper, gold, silver, and palladium is 5:1 to 1:5, preferably from 5:1 to 2:1. The mass ratio between the polymer fibers and the oxide material is 5:1 to 1:5.

The preparation method of the fibrous electrode material, including the following steps, (1) Preparation of electro spinning solution:

The platinum precursor, or platinum precursor and one or more of precursors of iron, nickel, cobalt, copper, gold, silver, palladium are fully dissolved in a solvent at a metal-based mass ratio of 5:1 to 1:5 so that the mass concentration of platinum in the resulting solution is 0.1% to 5% for further use;

adding the oxide material to the above solution until the mass concentration of the oxide material is 1% to 10%, stirring for 2 to 48 h to fully dissolve solids and for a homogenous solution for further use; uniform to be used.

The polymer is added to the above solution and the mass concentration of the polymer is 1% to 20% in the spinning solution, and is to be used after full dissolution and homogenous at room temperature to 60-80° C.;

(2) Using electrostatic spinning to prepare the fibrous electrode material.

The electrospinning preparation process is, the colloid spinning solution prepared in step (1) is fed to the inlet of the spinning injection device at a rate of 0.1 to 2 mL/min, the distance between the needle and the receiver is 5 to 20 cm. The receiver is made of a material selected from carbon fiber, carbon paper, and carbon cloth. The spinning potential is 10 to 30 kV while the spinning time is 10 to 600 min.

Because of the electrostatic interaction between the oxide material and platinum-based precious metal salt, most of the precious metal can be loaded on the surface of the oxides, thus exposing most of the precious metal active site to the surface of the nanofibers during the spinning process.

The precursor of platinum is one or more of chloroplatinic acid, platinum acetate. and dinitro diamine platinum. The precursors of iron, nickel, cobalt, copper, gold, silver and palladium are respectively iron nitrate, nickel nitrate, cobalt nitrate, copper nitrate, chloroauric acid, silver nitrate, and chloropalladic acid. The solvent is one or more of water, dimethylformamide, methanol, ethylene glycol, and ethanol. The oxide material includes one or more of silicon oxide, titanium oxide, tungsten oxide, indium tin oxide and derivatives thereof. The polymer is one or more of polyacrylic acid, polyethylene oxide, and polyvinylpyrrolidone.

After the reaction of the composite solution, the metal ions of the active electrocatalytic material in the spinning colloidal solution are completely reduced to nanoparticles with particle sizes of 2-20 nm.

The application of fibrous electrode material in high temperature polymer electrolyte membrane fuel cell.

Figure 1:
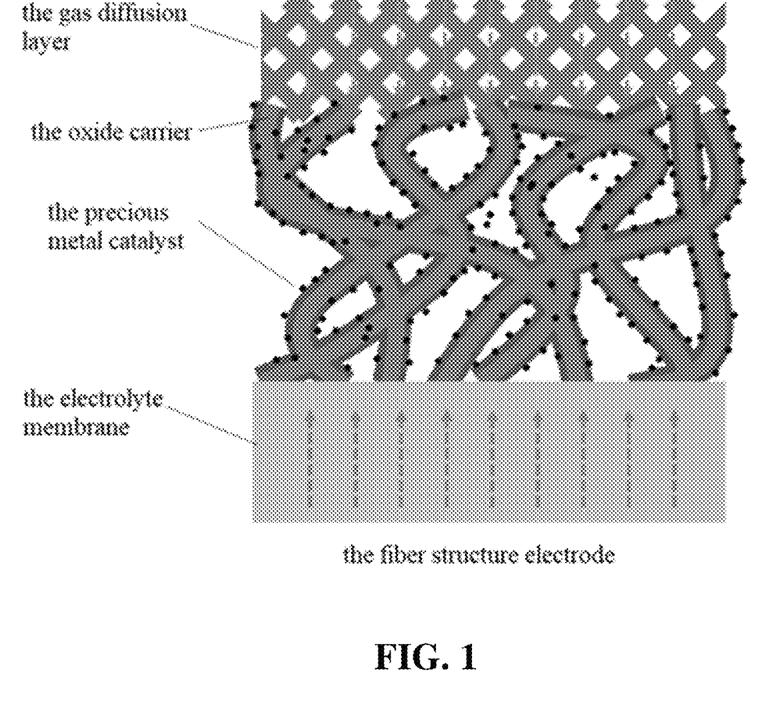
FIG. 1 is a diagram of the fibrous electrode material (containing oxide material) described in the present disclosure.
Figure 2A:
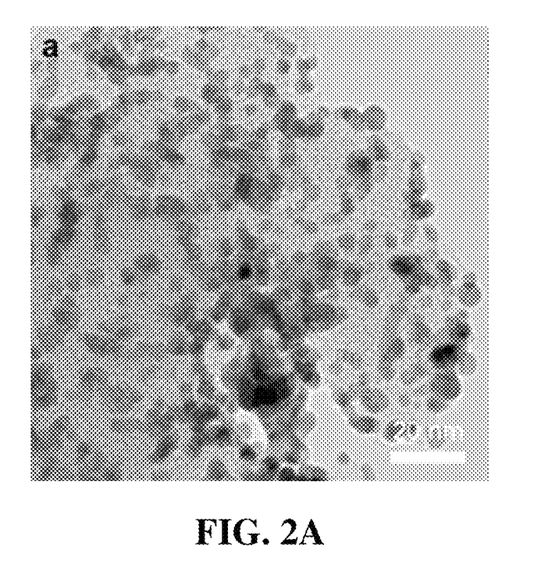
FIGS. 2A and 2B are TEM micrographs of a commercially available Pt/C catalyst on polymer fibers prepared by the method described in the present disclosure. This fibrous electrode material has regular and orderly fibers about 50 nm in diameter, and precious metal nanoparticles are uniformly loaded on the carrier surface, having an average particle size of 4 nm.
Figure 2B:
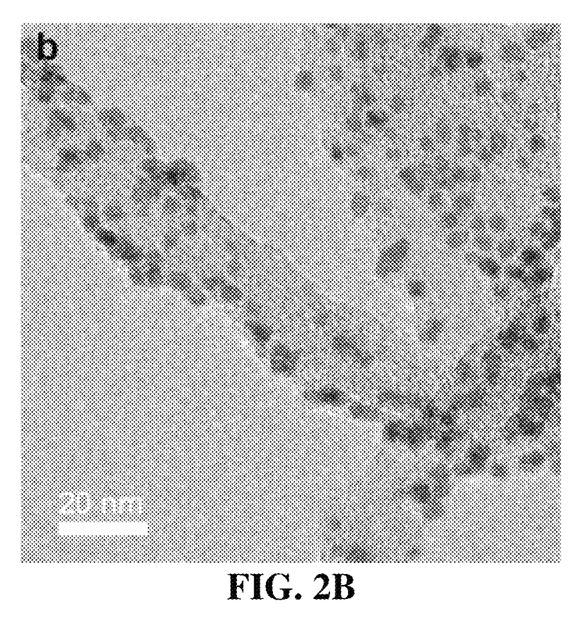
Figure 6:
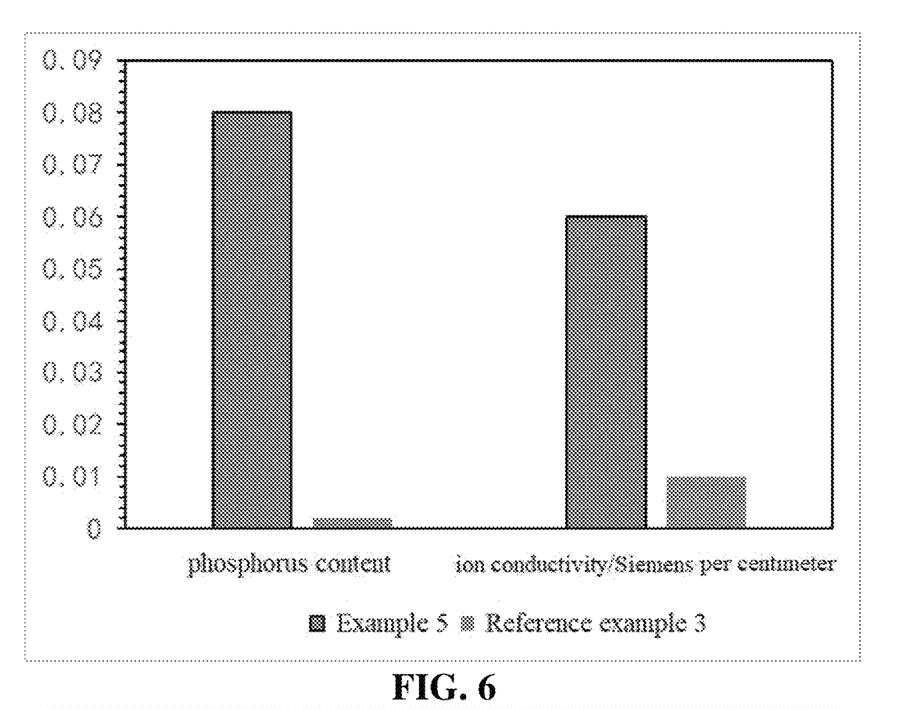
FIG. 6 compares the phosphorus content and the ion conductivity of the fibrous electrode prepared by the method described in the present disclosure according to Example 4 with an electrode material that does not contain organophosphorus material (Comparative Example 3).
Figure 7:
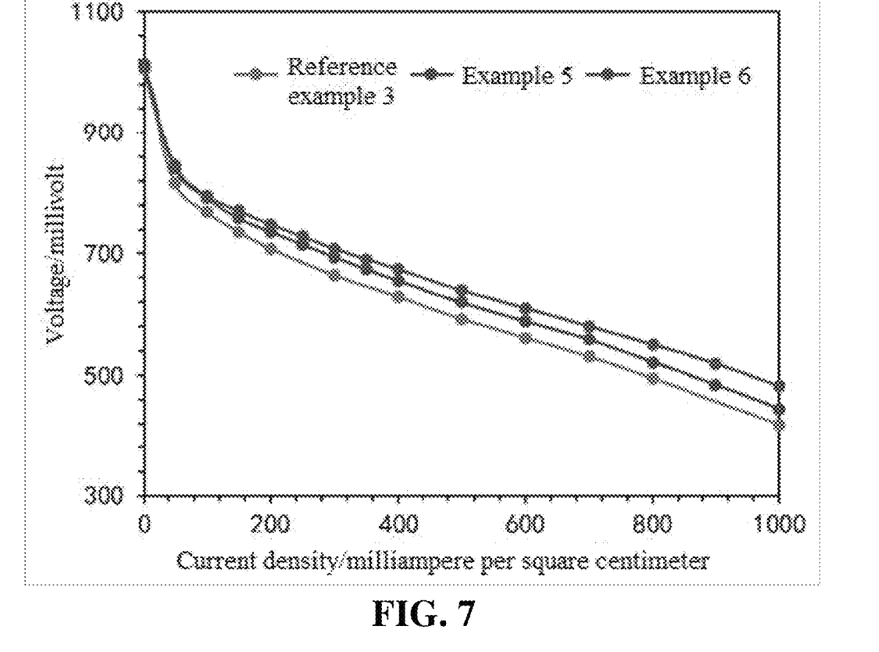
FIG. 7 shows the performance of the fibrous electrode prepared using the method described in the present disclosure according to Examples 4 and 5 in a high temperature electrolyte membrane fuel cell in comparison with Comparative Example 1. As can be seen from the figure, the performance of the fuel cell battery using the fibrous electrode prepared by the method of the present disclosure is obviously improved.

Compared with the existing technology, the present disclosure has the following advantages:

1. Structure is orderly and controllable: the fiber diameter and pore density of the fibrous electrode material prepared by the method described in the present disclosure can be controlled by the preparation process parameters. Through the ratio and solid content of different spinning polymer materials, the different viscosity of slurry can be adjusted, and spacing between potential and spinning needles can be further controlled, so that the adjustment of fiber diameter and porosity can be realized.
2. Good mass transfer performance: the fibrous electrode material prepared by the method described in the present disclosure, due to its improved porosity, have orderly pores orderly and a better mass transfer performance.
3. High utilization rate of precious metals: the fibrous electrode material prepared by the method described in the present disclosure, the precious metal surface can be mostly exposed to the mass transfer channel, as shown in FIGS. 2A and 2B, thus having a high utilization rate;
4. High electrode stability: Because the oxide material contains a high-valance metal or non-metallic elements, it is difficult to be further oxidized so that the oxide carrier used has a high anti-phosphoric acid corrosion performance. In the extended operation process, the electrode can resist the catalyst damage caused by carrier corrosion aging and has a high long-term stability;
5. Good utility: compared with other preparation methods, the static spinning preparation process is easily controllable, which reduces the uncontrollable factors and dis highly practical.
6. High efficiency of ion transmission: In the fibrous electrode material prepared by the method described in the present disclosure, the ion transmission channel is affixed on the surface of the catalytic material, which can greatly strengthen the ion transfer process. Comparing the electrode material prepared by the method described in the present disclosure (Example 4) and the electrode material without affixed organophosphorus groups (Comparative Example 3), the content of electrode phosphoric acid is greatly increased and the ion conductivity is greatly improved, as shown in FIG. 6;
7. Reduced phosphate poisoning: The fibrous electrode prepared according to the disclosed method contains phosphate groups affixed to the porous structure of the fiber, and does not directly cover the active material of precious metals, and its poisoning effect is significantly reduced. As shown in FIG. 7, the electrode material prepared by the method described in the present disclosure (Examples 4 and 5) is significantly improved with respect to the performance in the activated polarization zone compared with that of the traditional electrode material (Comparative Example 1), indicating that the catalytic active surface area of the electrode material is more exposed on the interface;
8. High phosphoric acid stability: the affixed phosphate group can adsorb free phosphoric acid, so that phosphoric acid in the electrode is retained and electrode stability is enhanced.

DESCRIPTION OF DRAWINGS

As shown in FIG. 3, the long-term stability of fuel cell having the fibrous electrode prepared by the method of the present disclosure is obviously improved.

IMPLEMENTATION

The present disclosure is illustrated in details using the following examples, but the present disclosure is not limited to the following examples.

Example 1

A. Preparation of composite spinning solution

A certain amount of chloroplatinic acid was added to the dimethylformamide solvent to achieve precious metal mass concentration of 2% and was fully dissolved. Add silica to the solution to reach a mass concentration of 5%, stirred for 2 h. Add polyacrylic acid to reach mass concentration of 5%, stirred for 2 h at room temperature, fully dissolved and homogenous.

The composite solution was heated to 120° C. under continuous stirring, continuously reacted for 4 h, cooled to room temperature, and continuously stirred for 1 h.

B. Electrostatic spinning of fibrous electrode material

The colloid spinning solution prepared by step A) above was fed into the inlet of the spinning injection device at a speed of 0.6 mL/min and the distance between the needle and the receiver was 10 cm. The receiver material was aluminum foil. The spinning potential was 20 kV and the spinning time was 30 min. The TEM micrograph of the resulting fibrous electrode material shows a diameter ranging from 80 to 100 nm, a pore size of about 10 nm, a porosity of 50%, and a Pt particle size of about 4 nm. The loading of the precious metal is about 1.5 mg/cm$^2$.

Figure 3:
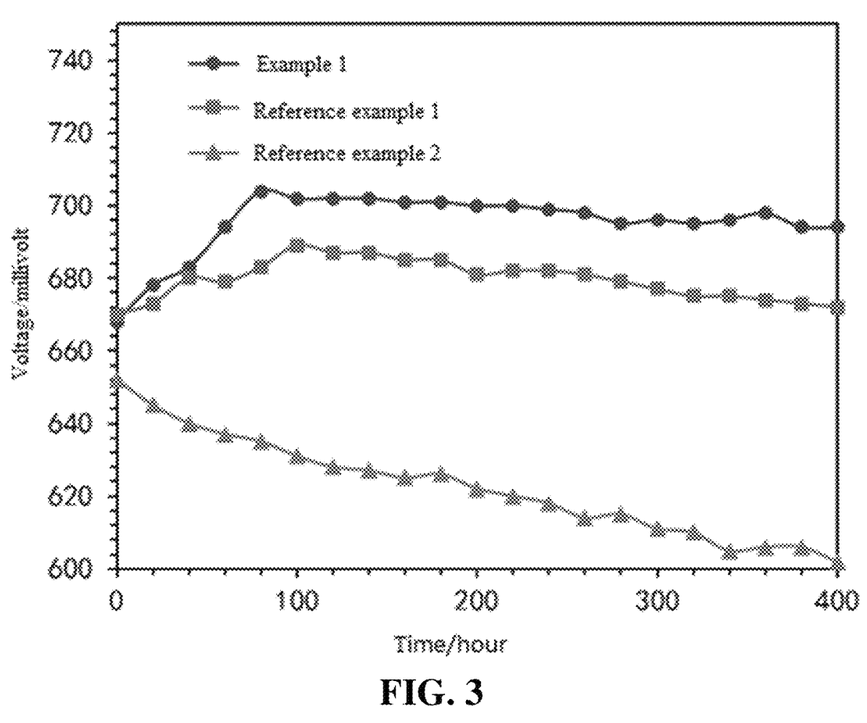
FIG. 3 shows results from a stability test of the fibrous electrode prepared by the method described in the present disclosure in a high temperature electrolyte membrane fuel cell (Example 1 vs. Comparative Example 1).

The fibrous electrode material was pressed together with the commercially available anode gas diffusion electrode and the phosphate-soaked commercially available electrolyte membrane having an acid content of about 450-500% of the mass of the original electrolyte membrane at 140° C. to form the membrane electrode. Characterization results of the film electrode are shown in FIG. 3.

Comparaptive Example 1

A. Preparation of catalyst slurry

A certain amount of 60% precious metal load of a commercially available Pt/C catalyst having 60% precious metal loading was mixed with water of ten times of its mass, ethanol of ten time of its mass, and Teflon of 10% of its mass, mixed evenly using ultrasonic mixing for 10 minutes;

B. Spraying catalytic layer preparation

The catalyst slurry prepared in the Step A was sprayed on the gas diffusion layer to reach a precious metal loading of about 1.5 mgcm$^{-2}$, and pressed together with a commercially available anode gas diffusion electrode, a phosphate-soaked commercially available electrolyte membrane having an acid content of about 450-500% of the mass of the original electrolyte membrane at 140° C. to form the electrode membrane. Characterization results of the film electrode are shown in FIG. 3.

Comparative Example 2

A. Preparation of composite spinning solution

A certain amount of chloroplatinic acid was added to the dimethylformamide solvent to achieve precious metal mass concentration of 2% and was fully dissolved. Add silica to the solution to reach a mass concentration of 5%, stirred for 2 h. Add polyacrylic acid to reach mass concentration of 5%. Stirred for 2 h at room temperature, fully dissolved and homogenous.

The composite solution was heated to 120° C. under continuous stirring, continuously reacted for 4 h, cooled to room temperature, and continuously stirred for 1 h for subsequent use.

B. Electrostatic spinning of fibrous electrode material

The colloid spinning solution prepared by Step A above was fed to the inlet of the spinning injection device at a rate of 0.6 mL/min. The distance between the needle and the receiver was 10 cm. The receiver material is aluminum foil, the spinning potential was 20 kV, and the spinning time was 30 min. The resulting fibrous electrode material has a diameter ranging from 80 to 100 nm, a pore size of about 10 nm, a porosity of 50%, and a Pt particle size of about 4 nm. The loading of the precious metal is about 1.5 mg/cm$^2$.

The fibrous electrode material was pressed together with the commercially available anode gas diffusion electrode and the phosphate-soaked commercially available electrolyte membrane having an acid content of about 450-500% of the mass of the original electrolyte membrane at 140° C. to form the membrane electrode. Characterization results of the film electrode are shown in FIG. 3.

The test results of Example 1 and Comparative Examples 1 and 2 show that the electrode structure having no oxide carrier performed worse than that of Example 1 with significant voltage drop and reduced stability during the stability test.

Example 2

A. Preparation of composite spinning solution

Chloroplatinic acid and cobalt nitrate were added to dimethylformamide, resulting in a solution having 1% mass concentration of the precious metal and a molar ratio of 5:1 between precious metals and cobalt. Tin oxide was added to the above solution to reach a mass concentration of 5% and stirred for 2 h. Polyacrylic acid was added to the above solution to reach a mass concentration of 5%, and stirred for 2 h at room temperature.

The composite spinning solution was heated to 120° C. under continuous stirring and continuously reacted for 4 h, cooled to room temperature, and continuously stirred for 1 h for subsequent use.

B. Electrostatic spinning of fibrous electrode material

The colloid spinning solution prepared by Step A above was fed to the inlet of the spinning injection device at a rate of 0.6 mL/min. The distance between the needle and the receiver was 10 cm, the receiver material was aluminum foil, the spinning potential was 20 kV, and the spinning time was 30 min. The TEM micrograph of the resulting fibrous electrode material shows a diameter ranging from 150 to 200 nm, pore sizes of the porous structure ranging from 10 to 20 nm, a porosity of 70%, and an average particle size of Pt nanoparticles of about 3 nm.

Example 3

A. Preparation of composite spinning solution

Chloroplatinic and nickel nitrate were added to dimethylformamide, resulting in a solution having 3% mass concentration of precious metals, a molar ratio of precious metals to cobalt of 3:1. Titanium oxide was added to the above solution to reach a mass concentration of 8% and was stirred for 2 h. Polycyclic ethylene was added to the above solution to reach a mass concentration of 5%, stirred for 2 h at room temperature until fully dissolved and homogenous for later use.

The composite solution was heated to 120° C. under continuous stirring and continuously reacted for 4 h, cooled to room temperature continuously stirred for 1 h for subsequent use.

B. Electrostatic spinning of fibrous electrode material

The colloid spinning solution prepared by Step A above was fed to the inlet of the spinning injection device at a rate of 0.6 mL/min. The distance between the needle and the receiver was 10 cm, the receiver material was aluminum foil, the spinning potential was 20 kV, and the spinning time was 30 min. The TEM micrograph of the resulting fibrous electrode material shows a diameter ranging from 100 to 150 nm, pore sizes of the porous structure ranging from 20 to 30 nm, a porosity of 60%, and an average particle size of Pt nanoparticles of about 5 nm.

Example 4

A. Preparation of composite spinning solution

Chloroplatinic and iron nitrate were added to dimethylformamide, resulting in a solution having 2% mass concentration of precious metal, and a molar ratio of precious metals to cobalt of 3:1. Tungsten oxide was added to the above solution to reach a mass concentration 10% and stirred for 2 h. Polyacrylic acid was added to the above solution to reach a mass concentration of 5%, stirred at room temperature 2 h until full dissolved and homogenous for subsequent use.

The composite solution was heated to 120° C. under continuous stirring and continuously reacted for 4 h, cooled to room temperature, and continuously stirred for 1 h for subsequent use.

B. Electrostatic spinning of fibrous electrode material

The colloid spinning solution prepared by Step A above was fed to the inlet of the spinning injection device at a rate of 0.6 mL/min. The distance between the needle and the receiver was 10 cm, the receiver material was aluminum foil, the spinning potential was 20 kV, and the spinning time was 30 min. The TEM micrograph of the resulting fibrous electrode material shows a diameter ranging from 100 to 150 nm, pore size of 10 to 15 nm, a porosity of 80%, and an average particle size of Pt nanoparticles of about 5 nm.

Example 5

A. Preparation of composite spinning solution

Chloroplatinic was added to dimethylformamide until the mass concentration of precious metal mass is 5%. Perfluorophosphate polymer was added to the above solution to reach a mass concentration of 0.5% and stirred for 2 h. Polyacrylic acid was added to the above solution until its mass concentration of 5%, and stirred for 2 h at room temperature condition.

The composite solution was heated to 120° C. under continuous stirring and continuously reacted for 4 h, cooled to room temperature, and continuously stirred for 1 h for subsequent use.

B. Electrostatic spinning of fibrous electrode material The colloid spinning solution prepared by Step A above was fed to the inlet of the spinning injection device at a rate of 0.6 mL/min. The distance between needle and the receiver was 10 cm. The receiver material was aluminum foil, the spinning potential was 20 kV, and the spinning time was 30 min. The SEM micrograph of the resulting fibrous electrode material shows a diameter ranging from 100 to 200 nm, pore sizes of the porous structure of 10 to 20 nm, and a porosity of 50%. The precious metal loading of electrode was about 1.5 mgcm$^{-2}$.

Figure 4:
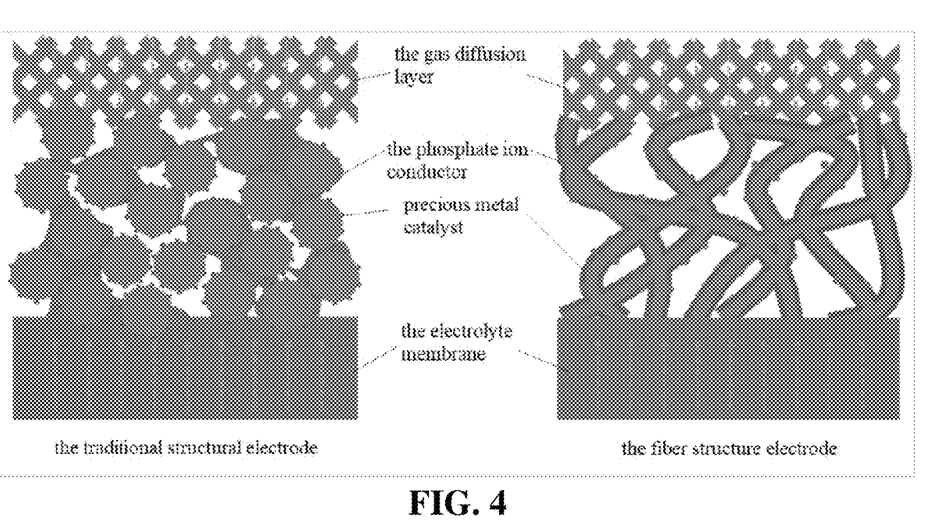
FIG. 4 shows schematics of the structure of the fibrous electrode containing phosphoric acid and the structure of a conventional electrode.
Figure 5:
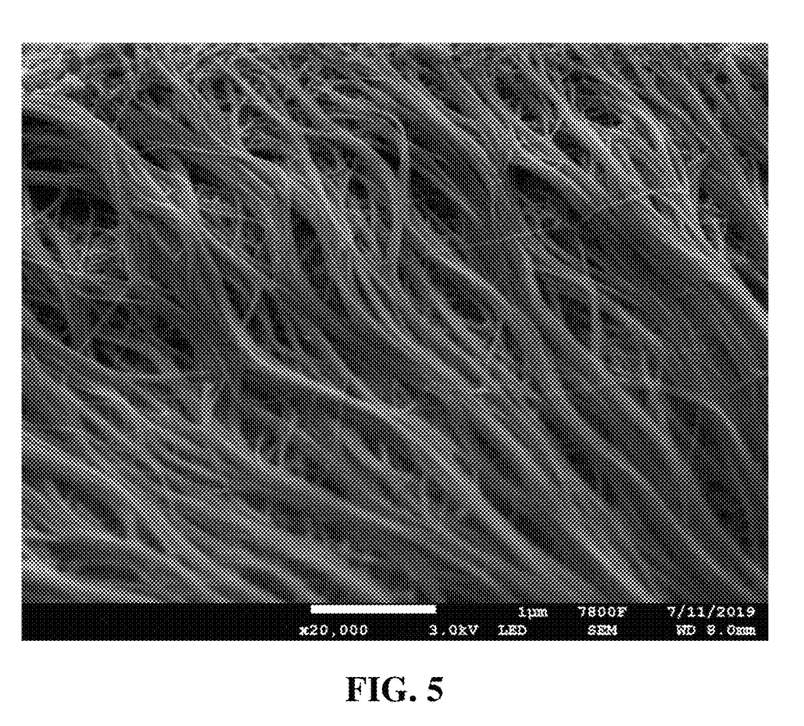
FIG. 5 is a SEM micrograph of the fibrous electrode material prepared by the method described in the present disclosure according to Example 4. This fibrous electrode has regular and orderly fibers having a diameter of about 100 nm.

The fibrous electrode material was pressed together with the commercially available anode gas diffusion electrode and the phosphate-soaked commercially available electrolyte membrane having an acid content of about 450-500% of the mass of the original electrolyte membrane at 140° C. to form the membrane electrode. Characterization results of the film electrode are shown in FIG. 4.

Comparative Example 3

A. Preparation of composite spinning solution

Chloroplatinic was added to dimethylformamide to reach a mass concentration of precious metal of 5%. Polyacrylic acid was added to the above solution to reach a mass concentration of 5%, stirred for 2 h at room temperature.

The composite solution was heated to 120° C. under continuous stirring and continuously reacted for 4 h, cooled to room temperature, and continuously stirred for 1 h for subsequent use.

B. Electrostatic spinning of fibrous electrode material

The colloid spinning solution prepared by Step A above was fed into the inlet of the spinning injection device at a rate of 0.6 mL/min. The distance between the needle and the receiver was 10 cm, the receiver material was aluminum foil, the spinning potential was 20 kV, and the spinning time was 30 min. The SEM of the resulting fibrous electrode material shows a diameter ranging from 100 to 200 nm, pore sizes of the porous structure ranging from 10 to 20 nm, and a porosity of 50%.

Example 6

A. Preparation of composite spinning solution

Chloroplatinic acid and cobalt nitrate were added to dimethylformamide to reach a mass concentration of 5% of precious metal and a molar ratio of precious metals to cobalt of 5:1. Perfluorophosphate polymer was added to the above solution to reach a mass concentration 0.5% and stirred for 2 h. Polyacrylic acid was added to the above solution to reach a mass concentration of 5% and stirred for 2 h at room temperature.

The composite solution was heated to 120° C. under continuous stirring and continuously reacted for 4 h, cooled to room temperature, and continuously stirred for 1 h for subsequent use.

B. Electrostatic spinning of fibrous electrode material

The colloid spinning solution prepared by Step A above was fed into the inlet of the spinning injection device at a rate of 0.6 mL/min. The distance between the needle and the receiver was 10 cm, the receiver material was aluminum foil, the spinning potential was 20 kV, and the spinning time was 30 min. The SEM micrograph of the resulting fibrous electrode material shows a diameter ranging from 50 to 80 nm, pore sizes of the porous structure ranging from 5 to 7 nm, and a porosity of 70%. The loading of precious metal was about 1.5 mg/cm².

The fibrous electrode material was pressed together with the commercially available anode gas diffusion electrode and the phosphate-soaked commercially available electrolyte membrane having an acid content of about 450-500% of the mass of the original electrolyte membrane at 140° C. to form the membrane electrode. Characterization results of the film electrode are shown in FIG. 4.

Example 7

A. Preparation of composite spinning solution

Chloroplatinic and nickel nitrate were added to the dimethylformamide to reach a mass concentration of 5% precious metal and a molar ratio of precious metal to cobalt of 3:1. polycarboxylate phosphite was added to the above solution to reach a mass concentration of 0.5% and stirred for 2 h. Polyacrylic acid was added to the above solution to reach a mass concentration of 5% and stirred for 2 h at room temperature.

The composite solution was heated to 120° C. under continuous stirring and continuously reacted for 4 h, cooled to room temperature, and continuously stirred for 1 h for subsequent use.

B. Electrostatic spinning of fibrous electrode material The colloid spinning solution prepared by Step A above was fed into the inlet of the spinning injection device at a rate of 0.6 mL/min. The distance between the needle and the receiver was 10 cm, the receiver material was aluminum foil, the spinning potential was 20 kV, and the spinning time was 30 min. The SEM micrograph of the resulting fibrous electrode material shows a diameter ranging from 150 to 200 nm, pore sizes of the porous structure ranging from 5 to 10 nm, and a porosity of 80%.

Example 8

A. Preparation of composite spinning solution

Chloroplatinic and iron nitrate were added to dimethylformamide to reach a mass concentration of 7% of precious metals and a molar ratio of precious metals and cobalt molar ratio of 3:1. Organophosphate tungsten acid was added to the above solution to reach a mass concentration of 0.5% and stirred for 2 h. Polyacrylic acid was added to the above solution to reach a mass concentration of 5% and stirred for 2 h at room temperature.

The composite solution was heated to 120° C. under continuous stirring and continuously reacted for 4 h, cooled to room temperature, and continuously stirred for 1 h for subsequent use.

B. Electrostatic spinning preparation of fibrous electrode material

The colloid spinning solution prepared by Step A above was fed into the inlet of the spinning injection device at a rate of 0.6 mL/min. The distance between the needle and the receiver was 10 cm, the receiver material was aluminum foil, the spinning potential was 20 kV, and the spinning time was 30 min. The resulting fibrous electrode material. The SEM micrograph of the resulting fibrous electrode material shows a diameter ranging from 50 to 80 nm, pore sizes of the porous structure ranging from 5 to 7 nm, and a porosity of 80%.

Example 9

A. Preparation of composite spinning solution

Chloroplatinic was added to dimethylformamide to reach a precious metal mass concentration of 2%. Silicon dioxide was added to the above solution to reach a mass concentration of 5% and stirred for 2 h, and organophosphate tungsten acid was added to the above solution to reach a mass concentration of 0.5% and stirred for 2 h. Polyacrylic acid was added to the above solution to reach a mass concentration of 5% and stirred 2 h at room temperature.

The composite solution was heated to 120° C. under continuous stirring and continuously reacted for 4 h, cooled to room temperature, and continuously stirred for 1 h for subsequent use.

B. Electrostatic preparation of fibrous electrode material

The colloid spinning solution prepared by Step A above was fed into the inlet of the spinning injection device at a rate of 0.6 mL/min. The distance between the needle and the receiver was 10 cm, the receiver material was aluminum foil, the spinning potential was 20 kV, and the spinning time was 30 min. The TEM micrograph of the resulting fibrous electrode material shows a diameter ranging from 80 to 100 nm, a pore size of about 10 nm, a porosity of 50%, and a Pt particle size of about 4 nm. The electrode precious metal loading is about 1.5 mg/cm², The fibrous electrode material was pressed together with the commercially available anode gas diffusion electrode and the phosphate-soaked commercially available electrolyte membrane having an acid content of about 450-500% of the mass of the original electrolyte membrane at 140° C. to form the membrane electrode and characterized.

The invention claimed is:

1. A fibrous electrode material, comprising: an active electrocatalytic material, polymer fibers, an oxide material, and an organophosphorus acid,
   wherein the polymer fibers are interwoven to form a carrier, the oxide material is affixed to the carrier and forms a porous structure, and the organophosphorus acid is affixed to the carrier, and
   the active electrocatalytic material is deposited on the porous structure of the oxide material affixed to the carrier,
   wherein the porous structure of the oxide material has a pore size ranging from 1 nm to 50 nm and a porosity of 40 to 60%, and the active electrocatalytic material is in form of nanoparticles having a diameter of 2-10 nm.

2. The fibrous electrode material according to claim 1, wherein the active electrocatalytic material comprises platinum, one or more platinum alloys, or both, wherein the platinum alloy comprises platinum and one or more metal selected from iron, nickel, cobalt, copper, gold, silver, and palladium; the oxide material comprises one or more composition selected from silicon oxide, titanium oxide, tungsten oxide, and indium tin oxide; the organic phosphoric acid is one or more selected from perfluorophosphate polymer, polycarboxylate phosphate, polycarboxylate phosphite, and phosphorous-containing heteropoly acid; the polymer material comprises one or more selected from polyacrylic acid, polyethylene oxide, and polyvinylpyrrolidone.

3. The fibrous electrode material according to claim 1, wherein, in the platinum alloy, a mass ratio between platinum and a remainder of the platinum alloy is 5:1 to 1:5.

4. A preparation method for preparing the fibrous electrode material of claim 1, comprising:
   dissolving a precursor of platinum, and optionally precursors of one or more metals selected from iron, nickel, cobalt, copper, gold, silver, and palladium in a solvent to form a first solution;

adding the oxide material and the organophosphorus acid to the solution to so that a mass concentration of the oxide material is 1% to 10%, a mass concentration of the organophosphorus acid is 0.1% to 5% to form a second solution, adding a polymer material to the second solution so that a mass concentration of the polymer material is 1% to 20% at room temperature to 60-80° C. to form a composite solution;

continuously mixing conditions the composite solution at 80 to 140° C. for 2 h to 8 h and cooling to room temperature to form a colloidal spinning solution; and carrying out electrostatic spinning to obtain the fibrous electrode material.

5. The preparation method according to claim 4, wherein the electrostatic spinning process comprises: feeding the spinning colloid solution into a spinning injection device at a rate of 0.1 to 2 mL/min at a spinning potential of 10 to 30 kV for a spinning time is 10 to 600.

6. The preparation method according to claim 4, wherein the precursor of platinum is one or more of chloroplatinic acid, platinum acetate and dinitro diamine platinum, the solvent is one or more selected from water, dimethylformamide, methanol, ethylene glycol, and ethanol, the organophosphorus acid is selected from perfluorophosphate polymer, polycarboxylate phosphate, polycarboxylate phosphite, and phosphorous-containing heteropoly acid, and the polymer material is one or more selected from polyacrylic acid, polyethylene oxide, and polyvinylpyrrolidone.

7. A polymer electrolyte membrane fuel cell, comprising a membrane that comprises the fibrous electrode material according to claim 1.

* * * * *